US009958310B2

(12) United States Patent
Faber et al.

(10) Patent No.: US 9,958,310 B2
(45) Date of Patent: May 1, 2018

(54) FILL LEVEL MEASUREMENT WITH IMPROVED DISTANCE DETERMINATION (71) Applicant: Endress + Hauser GmbH + Co. KG, Maulburg (DE)

(72) Inventors: Harald Faber, Lorrach (DE); Winfried Mayer, Buch (DE); Alexey Malinovskiy, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 181 days.

(21) Appl. No.: 14/890,717

(22) PCT Filed: Apr. 22, 2014

(86) PCT No.: PCT/EP2014/058090
§ 371 (c)(1),
(2) Date: Nov. 12, 2015

(87) PCT Pub. No.: WO2014/183959
PCT Pub. Date: Nov. 20, 2014

(65) Prior Publication Data
US 2016/0097671 A1    Apr. 7, 2016

(30) Foreign Application Priority Data
May 16, 2013  (DE) .......................... 10 2013 105 019

(51) Int. Cl.
*G01S 13/88*     (2006.01)
*G01F 23/284*    (2006.01)
(Continued)

(52) U.S. Cl.
CPC ........ *G01F 23/284* (2013.01); *G01F 23/0061* (2013.01); *G01F 23/0069* (2013.01);
(Continued)

(58) Field of Classification Search
CPC ................................ G01S 13/88; G01F 23/284
(Continued)

(56) References Cited

U.S. PATENT DOCUMENTS 5,406,842 A * 4/1995 Locke ................... G01F 23/284
                                                            324/643
6,107,957 A * 8/2000 Cramer ................ G01F 23/284
                                                            342/124
(Continued)

FOREIGN PATENT DOCUMENTS

DE    102009002785 A1    11/2010
DE    102010001866 A1    8/2011

OTHER PUBLICATIONS

English Translation of International Preliminary Report on Patentability, WIPO, Geneva, dated Nov. 26, 2015.
(Continued)

*Primary Examiner* — Peter Bythrow
(74) *Attorney, Agent, or Firm* — Bacon & Thomas, PLLC (57) ABSTRACT A method for determining frequency components of a discrete time signal, comprising steps as follows: transforming the discrete time signal into the frequency domain by means of a fast Fourier transformation, wherein a frequency spectrum is obtained as a sequence of frequency sample values, detecting peaks in the frequency spectrum, introducing at least one additional frequency support point in the vicinity of a detected peak, determining a frequency amplitude at the at least one additional frequency support point by means of the Goertzel algorithm, and determining the position of the peak maximum of the detected peak by applying both the frequency sample values delivered by the fast Fourier transformation as well as also the frequency amplitude at the at least one additional frequency support point.

13 Claims, 7 Drawing Sheets

(51) Int. Cl.
*G01F 23/00* (2006.01)
*G01S 13/34* (2006.01)
*G01S 7/35* (2006.01)

(52) U.S. Cl.
CPC ............ *G01S 13/34* (2013.01); *G01S 13/343* (2013.01); *G01S 13/345* (2013.01); *G01S 13/88* (2013.01); *G01S 2007/356* (2013.01)

(58) Field of Classification Search
USPC .......................................................... 342/124
See application file for complete search history.

(56) References Cited

U.S. PATENT DOCUMENTS

| | | | | |
|---|---|---|---|---|
| 7,355,548 | B2* | 4/2008 | Larsson | G01F 23/284 342/124 |
| 8,271,212 | B2* | 9/2012 | Sai | G01F 23/284 702/103 |
| 9,075,144 | B1* | 7/2015 | Straub | G01S 13/882 |
| 2004/0145510 | A1* | 7/2004 | Edvardsson | G01F 23/284 342/5 |
| 2005/0001761 | A1* | 1/2005 | Kliewer | G01S 7/352 342/174 |
| 2007/0046528 | A1* | 3/2007 | Larsson | G01F 23/284 342/124 |
| 2007/0236385 | A1* | 10/2007 | Kleman | G01F 23/284 342/124 |
| 2009/0212997 | A1* | 8/2009 | Michalski | G01F 23/284 342/137 |
| 2009/0235736 | A1* | 9/2009 | Spanke | G01F 23/2962 73/290 V |
| 2010/0070207 | A1* | 3/2010 | Sai | G01F 23/284 702/55 |
| 2011/0181458 | A1* | 7/2011 | Feil | G01F 23/284 342/124 |
| 2012/0007768 | A1* | 1/2012 | Hemmendorff | G01F 23/284 342/124 |
| 2012/0146796 | A1* | 6/2012 | Margon | A61B 5/05 340/573.1 |
| 2014/0085132 | A1* | 3/2014 | Jirskog | G01F 23/284 342/124 |
| 2015/0160066 | A1* | 6/2015 | Sai | G01F 23/284 342/21 |

OTHER PUBLICATIONS

International Search Report, EPO, The Netherlands, dated Aug. 28, 2014.
German Search Report, German PTO, Munich, dated Feb. 28, 2014.
Non-uniform spectrum sensing using computationally efficient 2-level (EFT-Goertzel) based Energy Detection, Prakruti V. Bhatt et al., Computer and Communication Technology 2012 Third International Conference, IEEE, Nov. 23, 2012, pp. 221-226.
"Numerical Recipes in C, Chapter 10, Minimization or Maximization of Functions," W. H. Press et al., Numerical Recipes in C: The Art of Scientific Computing, Jan. 1, 1992, pp. 394-405.
"A fixed IF 77-GHz FMCW Radar Sensor," Andreas Haderer et al., proceedings of the Asia-Pacific Microwave Conference 2008, Dec. 2008, pp. 1-4.
"Signal processing of laser Doppler self-volecimeter," Jian Zhou et al., Optics & Laser Technology 42, 2010, pp. 1038-1043.

* cited by examiner

FILL LEVEL MEASUREMENT WITH IMPROVED DISTANCE DETERMINATION

TECHNICAL FIELD

The invention relates to a method for determining frequency components of a discrete time signal. Furthermore, the invention relates to a method for determining distances to radar targets by means of FMCW radar, as well as to a distance measuring device for determining distance to radar targets by means of FMCW radar.

BACKGROUND DISCUSSION

Often applied in process automation technology are field devices, which serve for registering and/or influencing process variables. Examples of such field devices are fill level measuring devices, mass flow measuring devices, pressure- and temperature measuring devices, etc., which as sensors register the corresponding process variables, fill level, flow, pressure and temperature, respectively.

Referred to as field devices are, in principle, all devices, which are applied near to the process and deliver, or process, process relevant information.

A large number of such field devices are produced and sold by the firm, Endress+Hauser.

In the case of many measurement applications, a goal is to convert a time signal into a corresponding frequency spectrum, in order to be able to determine the frequency components contained in the frequency spectrum.

For example, for determining the fill level in a container or tank, a fill-level measuring device can be used, which works according to the FMCW radar principle. In such case, a frequency modulated radar transmission signal is transmitted and reflected on the surface of the liquid or the bulk good back to the fill-level measuring device. As a result of the measuring, one obtains a discrete time signal, which contains one or more frequency components. Based on the frequency components contained in the discrete time signal, the fill level in the container or tank can be derived. In such case, the accuracy, with which the fill level can be determined, depends on the accuracy, with which the frequency components contained in the time signal can be ascertained

SUMMARY OF THE INVENTION

An object of the invention is, consequently, to enable a determining of the frequency components contained in a time signal with improved accuracy.

This object is achieved by the method for determining frequency components of a discrete time signal according to forms of embodiment of the present invention includes transforming the discrete time signal into the frequency domain by means of a fast Fourier transformation, wherein a frequency spectrum is obtained as a sequence of frequency sample values. Moreover, the method includes detecting peaks in the frequency spectrum, introducing at least one additional frequency support point in the vicinity of a detected peak, determining a frequency amplitude at the at least one additional frequency support point by means of the Goertzel algorithm, and determining position of the peak maximum of the detected peak by applying both the frequency sample values delivered by the fast Fourier transformation as well as also the frequency amplitude at the at least one additional frequency support point.

The frequency spectrum can be selectively further divided in the vicinity of the peak by introducing additional frequency support points in the vicinity of a detected peak. The Goertzel algorithm enables determining frequency amplitude at the at least one supplementally introduced frequency support point with comparatively little calculative effort. By introducing additional frequency support points in the vicinity of the detected peak, the frequency spectrum is selectively refined where increased frequency resolution is required, namely in the vicinity of the peak. Since taken into consideration are both the frequency sample values delivered by the fast Fourier transformation as well as also the frequency amplitudes at the supplementally introduced frequency support points for determining the peak maximum of the detected peak, the position of the peak maximum can be determined with significantly higher accuracy than previously possible.

Especially, the method enables a more exact determining of the position of the peak in the frequency spectrum, without increasing the number of time sample values used from the fast Fourier transformation. Increasing the number of time sample values used from the fast Fourier transformation leads namely to a marked rise in the required computing power and memory requirement. The present method enables more exact determining of the peak maxima, without significantly increasing the required computing power or the required memory.

In such case, it is especially advantageous, when the above described method is used in a radar measuring device working according to the FMCW radar principle for determining distance to radar targets.

Especially advantageous is when the above described method is used in a fill-level measuring device working according to the FMCW radar principle for determining a fill level in a container or tank. Improved accuracy in determining the frequency components means that the fill level in a container or tank can, in this way, be determined with an accuracy in the submillimeter range.

The method for determining distances to radar targets by means of FMCW radar in forms of embodiment of the present invention includes transmitting a frequency-modulated transmission signal, receiving a received signal reflected on at least one radar target, mixing the received signal down into an intermediate frequency range and digitizing the obtained intermediate signal, determining position of the peak maximum of at least one frequency component contained in the digitized intermediate frequency signal by means of the above described method, as well as converting the position of the peak maximum into a distance to the radar target.

A distance measuring device corresponding to forms of embodiment of the present invention serves for determining distance to radar targets by means of FMCW radar and includes a transmitting unit, which transmits a radar transmission signal, a receiving unit, which receives a radar received signal reflected on at least one radar target, mixes the radar received signal down into an intermediate frequency range and digitizes the obtained intermediate frequency signal, as well as an evaluation unit, which is designed to determine the position of the peak maximum of at least one frequency component contained in the digitized intermediate frequency signal by means of the above described method.

BRIEF DESCRIPTION OF THE DRAWINGS

The invention will now be explained in greater detail based on a number of examples of embodiments shown in the drawing, the figures of which show as follows.

DETAILED DISCUSSION IN CONJUNCTION WITH THE DRAWINGS

In the case of distance measuring by means of radar according to the FMCW (Frequency-Modulated Continuous Wave) principle, a frequency modulated radar signal is transmitted in continuous wave operation and reflected on the respective target. The reflected signal is received by the distance sensor and evaluated.

Figure 1A:
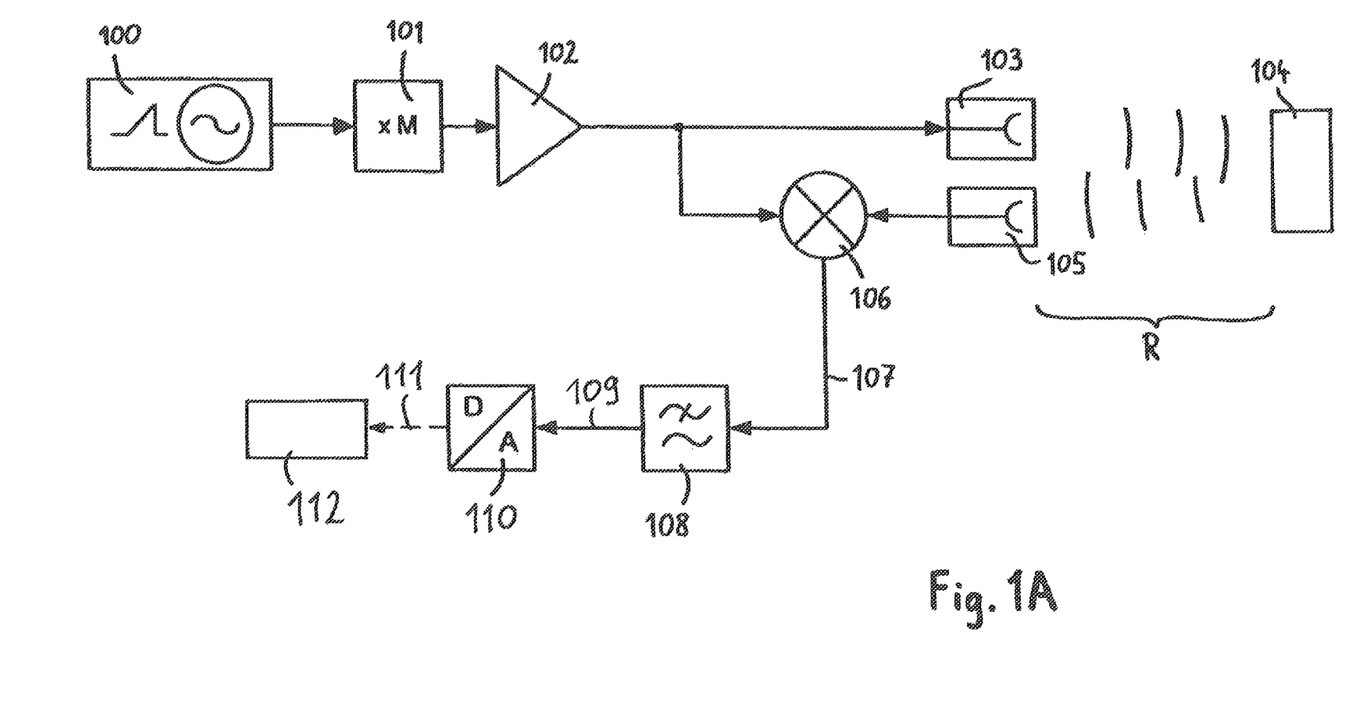
FIG. 1A is a block diagram of a distance sensor according to the FMCW principle.

FIG. 1A shows a block diagram of a distance sensor working according to the FMCW principle. The transmitting branch of the distance sensor includes a signal generator 100, which produces a frequency modulated signal. The signal produced by the signal generator 100 goes to an amplifier 102 via a frequency multiplying stage 101, in which the frequency of the signal is multiplied by a predetermined factor. In amplifier 102, the signal is amplified and then fed to a transmitting port 103. The transmitting port 103 emits the frequency modulated radar transmission signal.

Figure 1B:
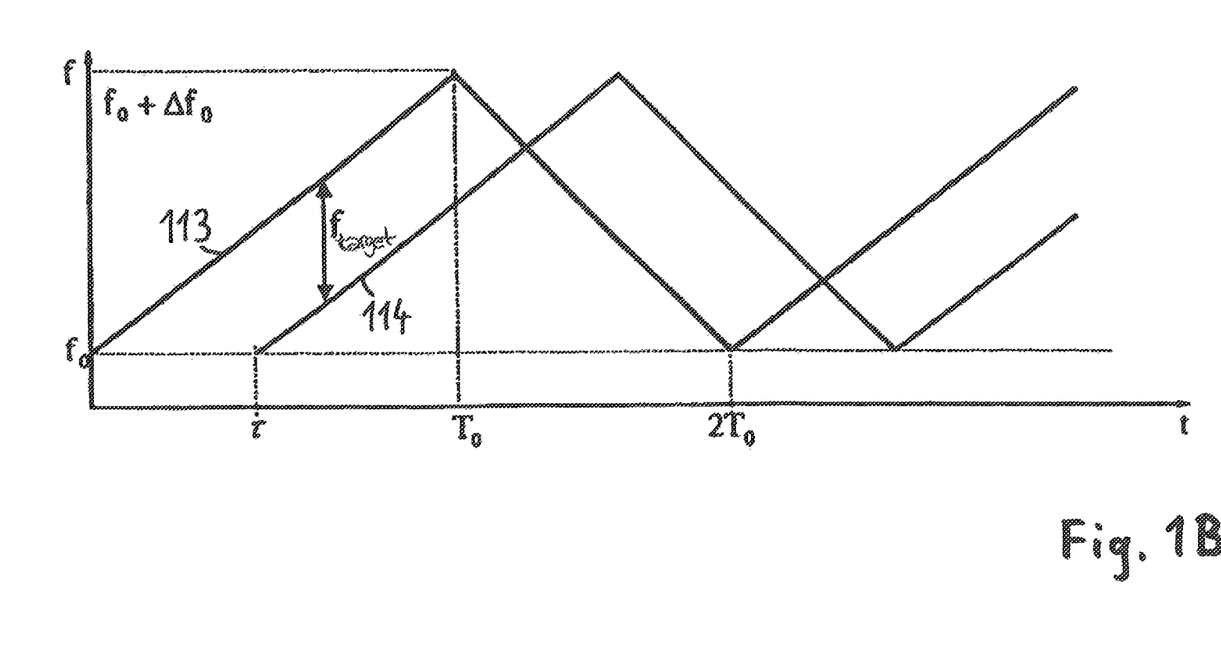
FIG. 1B is frequency of transmitted- and received signals as a function of time.

FIG. 1B shows frequency of the produced transmission signal 113 as a function of time. It is to be noted that the frequency of the transmission signal 113 alternately increases and decreases linearly, so that, as a whole, a triangular curve results. During a first modulation period length $T_0$, the frequency of the transmission signal increases linearly from the frequency $f_0$ to the frequency $f_0+\Delta f_0$, wherein the variable $\Delta f_0$ is referred to as the frequency sweep. During a second modulation period length $T_0$ following thereon, the frequency decreases linearly from $f_0+\Delta f_0$ back to $f_0$. Alternatively to the triangular curve, the frequency of the transmission signal can also have a sawtooth-shaped frequency curve.

The frequencies of radar transmission signals lie, for example, in the range of about 20 GHz to 100 GHz. The frequency sweep $\Delta f_0$ could amount to, for example, several GHz. The modulation period length could be selected, for example, from the range between about 0.1 msec and 5 msec. These figures serve only for illustrating typical orders of magnitude. Solutions outside these ranges are possible.

As shown in FIG. 1A, a part of the radiated transmission signal is reflected back to the distance sensor by a target 104 located a distance, or range, R from the distance sensor. The reflected signal is received by the receiving port 105 of the distance sensor and fed to a receiving mixer 106. In the receiving mixer 106, the received signal is mixed with the instantaneously transmitted transmission signal. The radar signal requires for the path from the transmitting port 103 to the target 104 and back to the receiving port 105 a travel time τ, which can be represented as $$\tau = \frac{2 \cdot R}{c} \tag{1}$$

wherein R is the target distance and c the speed of light.

FIG. 1B shows supplementally to the transmission signal 113 also the received signal 114 delayed by the travel time τ. During the travel time τ required by the radar signal, the transmission signal 113 produced by the signal generator continues to rise, so that the frequency of the instantaneously radiated transmission signal is higher than the frequency of the received signal. As a result of the travel time τ of the radar signal, there results, consequently, a frequency difference between transmitting- and received signal characteristic for the travel time τ and therewith for the distance to the target. This frequency difference is referred to as the target frequency $f_{target}$. The target frequency $f_{target}$ is likewise indicated in FIG. 1B.

The target frequency $f_{target}$ can be derived from the frequency sweep $\Delta f_0$ and the modulation period length $T_0$ of the transmission signal and from the travel time τ. The target frequency $f_{target}$ thus equals $$f_{target} = \frac{\Delta f_0}{T_0} \cdot \tau = \frac{\Delta f_0}{T_0} \cdot \frac{2 \cdot R}{c} \tag{2}$$

Since the variables $\Delta f_0$, $T_0$, c are constants, there is a direct proportionality between the target frequency $f_{target}$ and the associated distance R. The mixer signal 107 produced by the receiving mixer 106 in FIG. 1A consequently contains frequency components for one or more targets, from which, in each case, the associated distances can be determined.

The mixer signal 107 is filtered by a sampling lowpass filter 108, which suppresses frequency components above a limit frequency. The sampling lowpass filter 108 limits the bandwidth of the mixer signal 107 before the digitizing. Moreover, a maximum distance $R_{max}$ is established by the limit frequency. The lowpass filter filtered, intermediate frequency signal 109 is sampled and digitized by an analog to digital converter 110 The so obtained digitized, intermediate frequency signal 111 is fed for evaluation to the digital signal processing unit 112, which determines the frequency components contained in the intermediate frequency signal. Preferably, the digital signal processing unit 110 performs a Fourier transformation (Fast Fourier Transform, FFT) of the sample values, wherein from the peaks of the Fourier spectrum then the distances can be directly determined.

Figure 2:
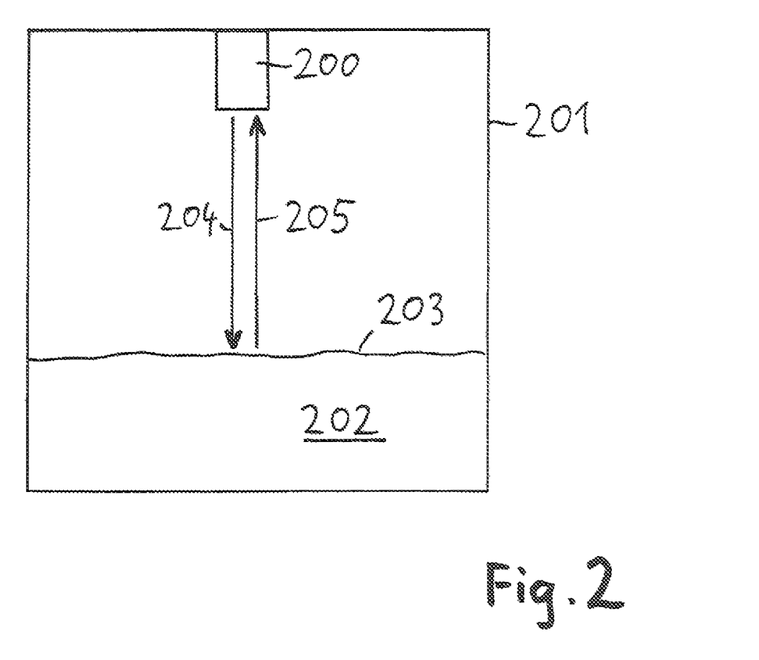
FIG. 2 is a fill level sensor for determining fill level in a container or tank.

Distance sensors of the type shown in FIG. 1A can be applied, for example, as fill level measuring devices in process measurements technology, in order to determine the distance to a surface of a liquid or a bulk good in a container. Such a fill-level measuring device is shown in FIG. 2. The fill-level measuring device 200 is mounted within a container or tank 201, which is partially filled with a liquid 202. The fill-level measuring device 200 is designed to measure the distance to the liquid upper surface 203 by means of FMCW radar. For this, the fill-level measuring device 200 sends a frequency modulated transmission signal 204 in continuous wave operation in the direction of the liquid upper surface 203. The radar signal is reflected on the liquid upper surface 203, and the reflected signal 205 is received and evaluated by the fill-level measuring device 200. From the target frequency component $f_{target}$ in the intermediate frequency signal, the fill-level measuring device 200 can then determine the distance to the liquid upper surface 203 as well as the fill level in the container or tank 201. Such fill level measuring devices are applied, for example, in an oil tank, in order to determine the fill level of the oil as exactly as possible.

Figure 3A:
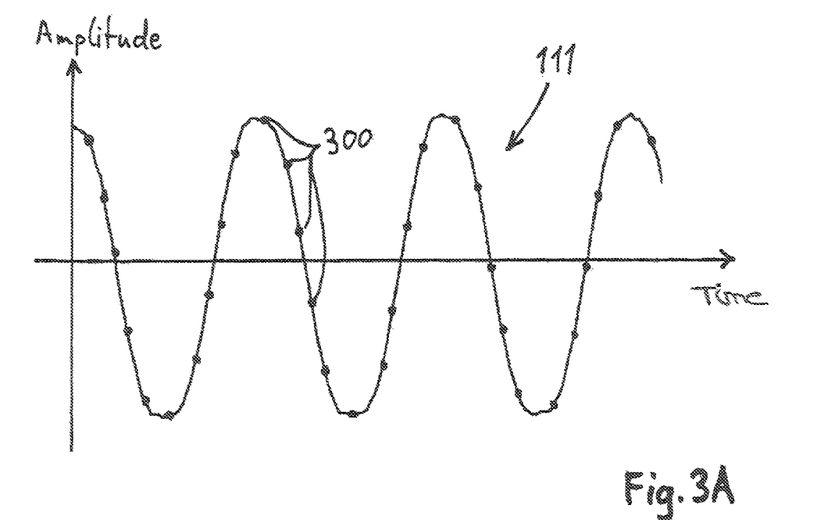
FIG. 3A is the digitized intermediate frequency signal as a function of time.

FIG. 3A shows the digitized intermediate frequency signal 111 plotted as a function of time. The digitized intermediate frequency signal 111 is composed of a time series of sampled values 300. This time series of sampled values 300 is produced by digitizing the lowpass filtered, intermediate frequency signal 109 using the analog to digital converter 110 with a predetermined sampling rate. The digitized intermediate frequency signal 111 is fed to the signal processing unit 112 for additional evaluation. At the signal processing unit 112, the intermediate frequency signal 111 is transformed by means of a fast Fourier transformation (FFT, Fast Fourier Transform) from the time domain into the frequency domain. In this way, the frequency components contained in the intermediate frequency signal can be analyzed.

A fast Fourier transformation (FFT, Fast Fourier Transform) is an algorithm for efficiently calculating the values of a discrete Fourier transformation (DFT, Discrete Fourier Transform). In the discrete Fourier transformation, the time sample values $x_j$ (j=0, 1 . . . N−1) of a signal are converted into frequency sample values $f_k$ (k=0, 1 . . . N−1) in the frequency domain:

$$f_k = \sum_{j=0}^{N-1} e^{-2\pi i \frac{jk}{N}} \cdot x_j \quad (3)$$

This sum is calculated with the assistance a fast Fourier transformation (FFT, Fast Fourier Transform). A fast Fourier transformation is a calculating method, with which the result of a discrete Fourier transformation can be calculated in especially fast and efficient manner.

Before performing the fast Fourier transformation, the average value of the sample values belonging to the scan time series is ascertained and subtracted from the sampled values. Such an average value removal eliminates a possible dc portion of the sample values.

A prerequisite for application of an FFT algorithm is that the number N of the time sample values is a power of two. The number N of sampled values can thus be represented as $N=2^n$, wherein n is a natural number. This is, in general, not a serious limitation, since the number of sample values in the time series can, in general, be freely selected. In the case of the FMCW measuring shown in FIGS. 1 and 2, for example, $2^{12}$=4096 sample values of the intermediate signal can be used as starting point for a fast Fourier transformation. This can be achieved, for example, by selection of a suitable time window of the intermediate signal, thus by a so-called "windowing".

The basic idea of the fast Fourier transformation (FFT) is to divide up the calculating of a DFT of size 2n, first of all, into two calculations of size n. This can be done, for example, by dividing the vector with the 2·n sampled values into a first vector of the sample values with even index and into a second vector of the sample values with uneven, or odd, index. The two partial results of these two discrete Fourier transformations of size n are combined after the transformation back to a Fourier transformation of size 2·n. In this way, the fast Fourier transformation can use earlier calculated intermediate results and so save arithmetic calculational operations.

An advantageous way of performing an FFT is implementation as a recursive algorithm. In such case, the field with the 2·n sampled values is transferred to a function as parameters. The function divides the field into two half as long fields (one with the sampled values with even index and one with the sampled values with uneven index). These two fields are transferred to new instances of this function. At the end, each function returns the FFT of the field transferred to it as parameters. These two FFTs are then, before an instance of the function is ended, combined to a single FFT, and the result is returned to the caller. This is continued, until the argument of a call of the function is composed of only a single element. The FFT of a single value is, however, exactly that value, because the value has itself as terminal component and no additional frequency fractions. The function, which contains only a single value as parameter, can thus return the FFT of this value without further calculation. The function, which has called the function, combines the FFTs comprising in each case one sample value and it gets the FFTs returned, the function which in turn has called this function, combines the two FFTs composed of two values, etc.

Alternatively to the described procedure, a fast Fourier transformation can also be implemented by means of a non-recursive algorithm.

Figure 3B:
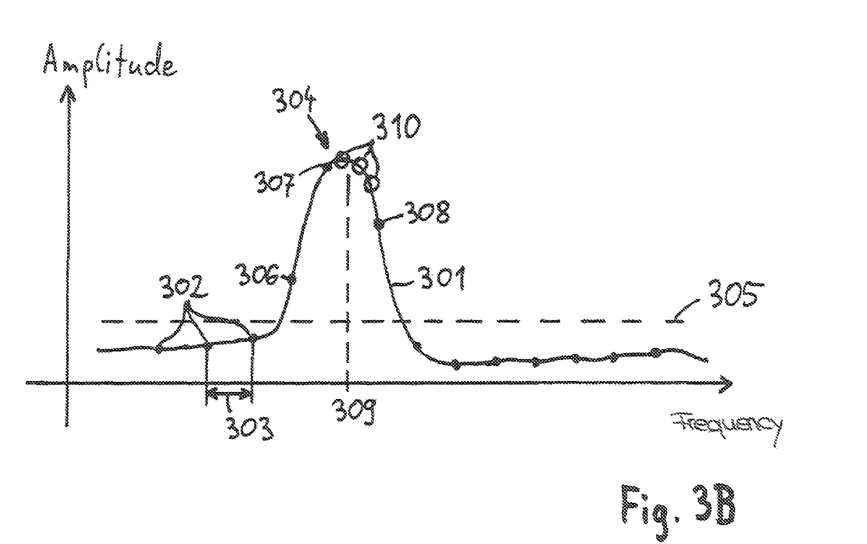
FIG. 3B is the frequency spectrum for the intermediate frequency signal shown in FIG. 3A as determined by means of a fast Fourier transformation.

When the discrete time signal shown in FIG. 3A is transformed by means of a fast Fourier transformation into the frequency domain, one obtains as a result the frequency spectrum 301 shown in FIG. 3B. Plotted along the horizontal axis is the frequency, and along the vertical axis the associated amplitude. The frequency spectrum 301 is a discrete frequency spectrum, which has a number of frequency sample values 302 arranged in a regular raster. In such case, the time interval 303 between neighboring frequency sample values is determined by the number N of the time sample values, which were fed as input values to the fast Fourier transformation. The larger the number of sample values N, the smaller is the interval 303 between neighboring frequency sample values 302, and the better is the resolution of the frequency spectrum.

The frequency components contained in the intermediate frequency signal 111 show up as peaks in the discrete frequency spectrum 301. Each peak is caused by a radar target located a certain distance from the radar sensor. The radar signal transmitted by the radar sensor is reflected on the radar target and travels back to the radar sensor. The farther the radar target is from the radar sensor, the higher is the frequency of the frequency component caused by the radar target. The frequency of a peak in the frequency spectrum enables, consequently, directly the determining of the distance to the associated radar target. The converting of the target frequency into distance occurs according to the relationship:

$$R = f_{target} \cdot \frac{T_0 \cdot c}{2 \cdot \Delta f_0}. \quad (4)$$

In such case, R is the distance, $f_{target}$ the target frequency, $\Delta f_0$ the frequency sweep, $T_0$ the modulation period length of the transmission signal and c the speed of light. The more exactly the position of the peak in the frequency spectrum 301 can be ascertained, the more exactly the distance R of the radar target from the radar sensor can be determined.

FIG. 3B shows, by way of example, a frequency spectrum 301 with only one peak 304. For detection of the peak in the frequency spectrum 301, it is, first of all, ascertained, at which frequency sample values 302 the frequency amplitude $f_k$ lies above the noise level, such indicating the presence of a peak. For this, the frequency amplitudes $f_k$ of the frequency sample values 302 can be compared, for example, with a predetermined threshold value 305. In the case of the example shown in FIG. 3B, one obtains, in this way, the three frequency sample values 306, 307, 308, which belong to the peak 304. By means of an interpolation method based on the frequency amplitudes of the three frequency sample values 306, 307, 308, the curve of the spectrum around the peak maximum can be interpolated. In this way, the position of the maximum of the peak 304, thus the peak frequency 309, can be determined. From this peak frequency 309, then the distance R to the radar target can be derived.

However, because of the relatively coarse raster of the frequency sample values 302, only a comparatively inexact determining of the peak frequency 309 is possible. Therefore, by means of an FFT and a following interpolation, the distance to a radar target can only be ascertained with an accuracy in the region of millimeters to centimeters. This is no longer sufficient for current highly accurate radar sensors, which are applied especially in the field of fill level measurement. The goal in the case of fill level measurement would be to be able to read the fill level, for example, in a large tank with an accuracy in the submillimeter region.

For improving the accuracy of measurement, it would, in principle, be possible to increase the number N of time sampled values, in order to obtain by means of the fast Fourier transformation a more finely resolved frequency spectrum 301. However, in order to achieve an accuracy of measurement in the submillimeter range, thus, for example, under 0.5 mm, about $2^{20}$ (about 1 million) time sample values would have to be processed. This is not implementable in present systems.

Corresponding to the forms of embodiment of the present invention, it is provided that the peak in the frequency spectrum is determined as above described based on the comparatively coarse raster of the frequency sample values and then in an additional step the frequency raster in the vicinity of the detected peak is refined by introducing additional frequency support points. These additional frequency support points 310 are shown in FIG. 3B. For each of the newly introduced frequency support points 310, the associated frequency amplitude is determined.

In such case, for selectively determining the spectral amplitudes at the supplementally introduced frequency support points 310, either the discrete Fourier transformation (DFT) can be calculated, or the Goertzel algorithm can be applied.

The Goertzel algorithm enables an efficient calculating of the frequency amplitudes of individual spectral components. Thus, use of the Goertzel algorithm is especially advantageous, when not the complete frequency spectrum should be determined, but, instead, only a few spectral components at selected frequencies. With the help of the Goertzel algorithm, it is especially possible to determine individual frequency amplitudes at determined frequencies with comparatively little calculational effort. A description of the Goertzel algorithm is set forth in Appendix A.

By introducing additional frequency support points 310, the frequency spectrum 301 is sampled with very high resolution in the frequency domain exactly where the peaks are located. For interpolating a peak 304, then both the frequency sample values 306, 307, 308 delivered by the FFT as well as also the frequency amplitudes at the supplementally introduced frequency support points 310 are taken into consideration. In this way, the curve of the spectrum in the vicinity of the peak maximum is essentially more exactly redrawn. Based on suitable interpolation methods, then the peak frequency 309, thus the position of the peak 304 in the frequency spectrum 301, can be determined very exactly. By introducing and calculationally considering the additional frequency support points 310, the desired accuracy of measurement in the submillimeter domain can be achieved for determining distance to radar targets.

Figure 4:
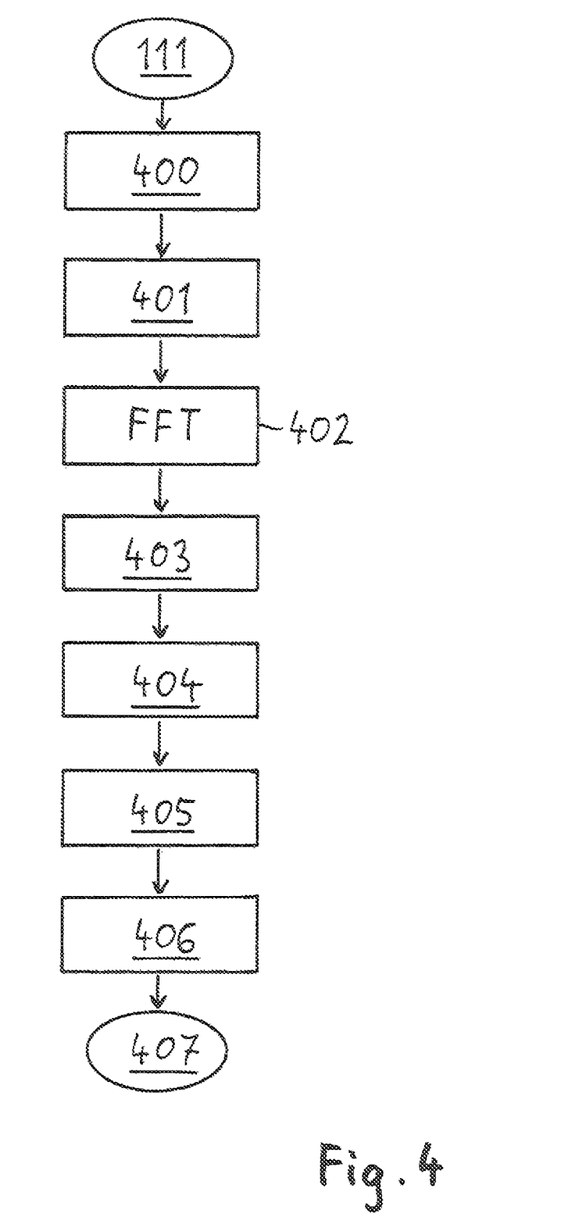
FIG. 4 shows a method for determining the frequency components contained in the spectrum.

FIG. 4 indicates the individual steps of the method for evaluating the time signal. Serving as starting point for calculating the frequency spectrum is the digitized intermediate frequency signal 111. This digitized intermediate frequency signal 111 comprises a time series of time sampled values.

In the first step 400, the average value of the time sample values is determined, and this average value is then subtracted from each of the time sample values. As a result, one obtains corrected time sample values, which have no dc portion.

In the next step 401, the so-called "windowing", a section of the time series of the sample values is established. This section of the time series serves as starting point for a fast Fourier transformation (FFT) and should, consequently, comprise $2^n$ time sample values, wherein n is a natural number.

In the next step 402, the sequence of time sampled values is transformed with the assistance of the fast Fourier transformation (FFT, Fast Fourier Transform) into the frequency domain. As a result of the fast Fourier transformation, one obtains a discrete frequency spectrum.

In the following step 403, the peaks contained in the frequency spectrum are detected. For detecting the peaks, for example, the locations of the frequency spectrum can be ascertained, where the frequency amplitudes lie above a predetermined threshold value.

After the peaks of the frequency spectrum have been identified, in the next step 404, additional frequency support points are inserted in the vicinities of the peaks. With help of these additional frequency support points, the relatively coarse frequency raster, which was delivered by the FFT, is further divided. In this way, the resolution of the frequency spectrum is selectively improved in the vicinity of the detected peaks. For each supplementally introduced frequency support point, the associated frequency amplitude is calculated, wherein for calculating the frequency amplitudes preferably the Goertzel algorithm is applied. Alternatively thereto, the frequency amplitudes at the additional frequency support points could also be calculated by means of a discrete Fourier transformation (DFT).

In the next step 405, the position of the peak in the frequency spectrum, respectively the peak frequency, is determined with highest possible accuracy. For this, it is ascertained by applying a suitable interpolation method, at which position of the peak the frequency amplitude reaches its maximum. In the case of this interpolation, both the frequency amplitudes delivered by the FFT as well as also the frequency amplitudes at the supplementally introduced frequency support points are taken into consideration.

In the last step 406, the peak frequency determined with high accuracy is converted into a distance to the radar target. In this way, the distance 407 to the radar target can be determined with a resolution in the submillimeter range.

Different options are available for introducing additional frequency support points. Three of these options will now be described in greater detail.

Thus, in a first option, the frequency raster predetermined by the FFT is further divided in the vicinity of a peak by continued interval halving, i.e., in each case, in the middle between two neighboring frequency sample values, an additional frequency support point is inserted. By continued interval halving, the resolution of the frequency spectrum can be refined as much as desired.

In a second option, the frequency intervals between neighboring frequency sample values are divided by introducing additional frequency support points asymmetrically, wherein as division ratio, for example, the golden section can be used. By a continued interval subdivision according to the golden section, likewise any desired resolution of the frequency spectrum can be achieved.

In a third option, there is used for determining the peak frequency the "method of Brent", which is described, for example, in Chapter 10.2 of the standard work "Numerical Recipes in C: The Art of Scientific Computing", William H. Press, 2nd edition, 1992. In this approximation method, there is placed through the frequency sample values delivered by the FFT a first approximating parabola, which approximates the course of the spectrum in the vicinity of the peak maximum. The peak of this approximating parabola is inserted as an additional frequency support point, which is taken into consideration for determining a second approximating parabola. The second approximating parabola approximates the course of the spectrum in the vicinity of the peak maximum with still higher accuracy. In this way, the peak frequency can be won as peak of a series of converging, approximating parabolas.

These three methods for refining the frequency spectrum will now be discussed in greater detail.

Figure 5:
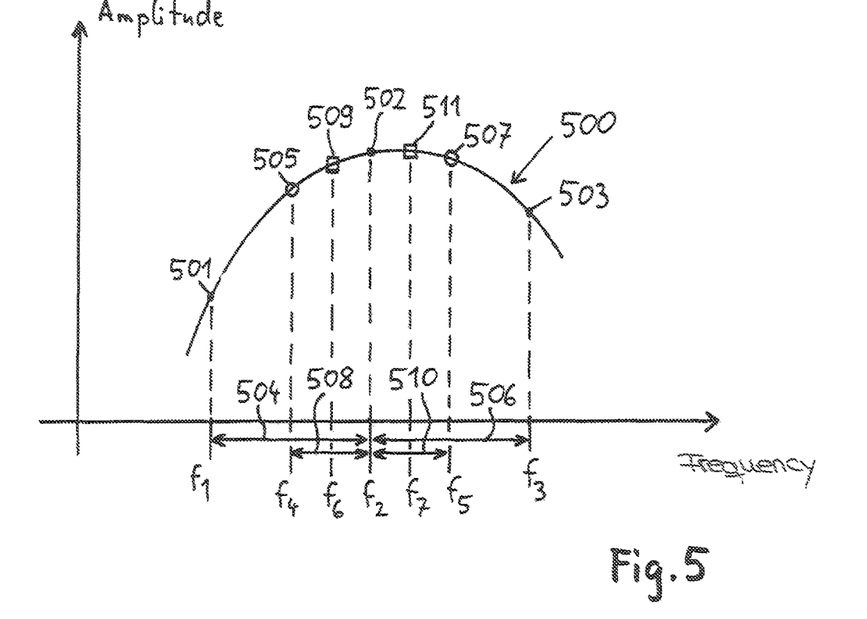
FIG. 5 shows additional subdividing of the frequency raster delivered by the FFT in the vicinity of a peak by continued interval halving.

The method of continued interval halving will be illustrated, by way of example, based on FIG. 5. FIG. 5 shows a peak 500 of the frequency spectrum. Plotted along the horizontal axis is frequency, and along the vertical axis frequency amplitude. The fast Fourier transformation delivers the points 501, 502, 503 at the frequencies $f_1$, $f_2$ and $f_3$. This relatively coarse frequency raster, which is delivered by the fast Fourier transformation (FFT), will now be divided further by the introduction of additional frequency support points. For this, the frequency interval 504 between the frequencies $f_1$ and $f_2$ is centrally divided, in order, in this way, to define an additional frequency support point $f_4$. The frequency amplitude belonging to the frequency $f_4$ is determined with the assistance of the Goertzel algorithm. In this way, one obtains the additional point 505 of the frequency spectrum. Likewise the frequency interval 506 between the frequency $f_2$ and the frequency $f_3$ is centrally divided, in order, in this way, to define the additional frequency support point $f_5$. The frequency amplitude belonging to the frequency $f_5$ is determined with the assistance of the Goertzel algorithm. In this way, one obtains the additional point 507 of the frequency spectrum. From the previously found five points 501, 505, 502, 507, 503, now the three neighboring points with the highest frequency amplitudes are selected. In the example of FIG. 5, these are the three points 505, 502 and 507. For additional refinement of the frequency spectrum, the frequency interval 508 between the frequencies $f_4$ and $f_2$ is centrally divided, in order, in this way, to define an additional frequency support point $f_6$. The frequency amplitude for frequency $f_6$ is determined by means of the Goertzel algorithm, and one obtains the additional point 509. Likewise the frequency interval 510 between the frequencies $f_2$ and $f_5$ is centrally divided, and, as result this interval halving, one obtains the additional frequency support point $f_7$. The frequency amplitude for frequency $f_7$ is determined by means of the Goertzel algorithm, and one obtains the additional point 511. Of the previously ascertained points of the frequency spectrum, the three points 502, 511 and 507 have the highest frequency amplitudes and can be taken into consideration as starting point for another iteration of the interval halving. As soon as a desired resolution of the frequency spectrum has been achieved, the interval halving is interrupted. Output as peak frequency is then the frequency of that point, for which the so far highest frequency amplitude was ascertained.

In the case of the method shown in FIG. 5, the frequency intervals between neighboring points are, in each case, centrally divided, in order so to introduce additional frequency support points and, in this way, to refine the resolution of the spectrum. In contrast, in the case of the second method for continued interval subdivision, the frequency intervals between neighboring points in the vicinity of a peak are, in each case, asymmetrically divided according to a predetermined division ratio. For example, the frequency intervals can be divided in the ratio of the golden section. By asymmetric subdividing, additional frequency support points are defined. The frequency amplitudes at these additionals frequencies support points are determined by means of the Goertzel algorithm. The neighboring points with the highest frequency amplitudes serve as a basis for the next iteration. The frequency intervals between these points are, in turn, asymmetrically divided corresponding to the ratio of the golden section. The method of asymmetric interval subdivision is continued until a desired resolution of the frequency spectrum is achieved. Then the interval subdivision is interrupted. Output as peak frequency is then the frequency of that point, for which the so far highest frequency amplitude was ascertained. By asymmetric subdividing of the frequency intervals, the convergence behavior can in some cases be positively influenced.

Figure 6:
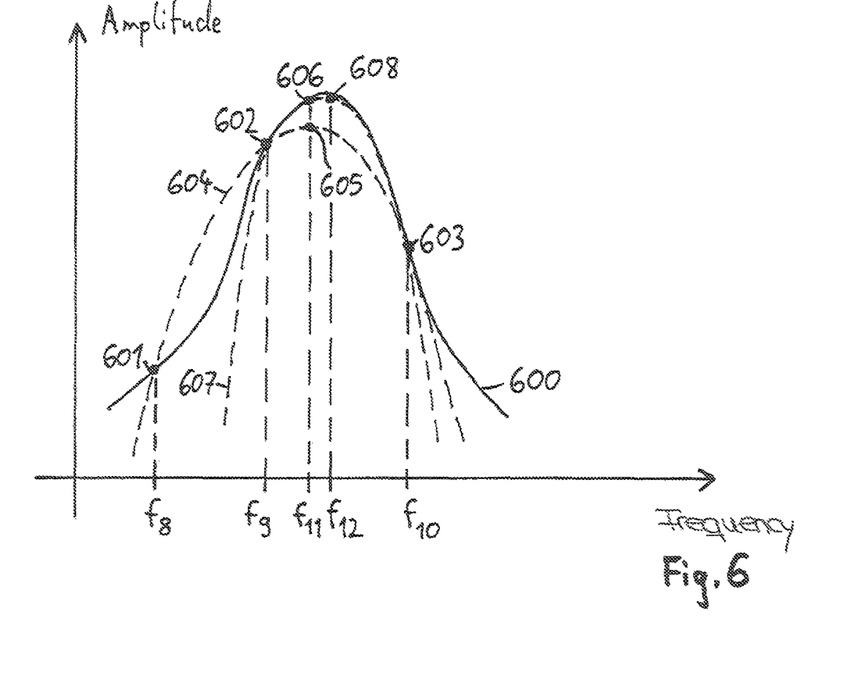
FIG. 6 shows the method of Brent for approximating a peak in the vicinity of a peak maximum with the assistance of parabolas.

FIG. 6 shows how with the assistance of the "method of Brent" the maximum of a peak in the frequency spectrum can be determined. The "method of Brent" is described, for example, in Chapter 10.2 of the standard work "Numerical Recipes in C: The Art of Scientific Computing", William H. Press, 2nd edition, 1992, and is incorporated by reference into the disclosure of this application.

FIG. 6 shows a peak 600 of the frequency spectrum. Plotted along the horizontal axis is frequency, and along the vertical axis frequency amplitude. Moreover, shown in FIG. 6 are three frequency sample values 601, 602, 603 at the frequencies $f_8$, $f_9$, $f_{10}$, which were obtained as a result of the fast Fourier transformation. In the first step of the "method of Brent", the peak 600 is approximated by a first approximating parabola 604, which is defined by the frequency sample values 601, 602, 603. The first approximating parabola 604 has its peak 605 at the frequency $f_{11}$. This frequency $f_{11}$ of the peak 605 is used as an additional frequency support point for the next iteration of the parabola approximation. In this regard, the frequency amplitude at the additional frequency support point at the frequency $f_{11}$ is calculated by means of the Goertzel algorithm. In this way, one obtains the additional point 606 of the frequency spectrum. For the next iteration then the three points 602, 606, 603 of the spectrum are used, which have the highest so far ascertained frequency amplitudes. These three points 602, 606, 603 establish a second approximating parabola 607, which approximates the curve of the peak 600 in the vicinity of the peak maximum better than the first approximating parabola 604. The second approximating parabola 607 has its peak 608 at the frequency $f_{12}$. The frequency $f_{12}$ could already be considered as a sufficiently more exact, approximate value for the peak maximum. In case the accuracy is considered sufficient, one would end the calculating here. Alternatively, one could, in given cases, improve the accuracy yet more by using the frequency $f_{12}$ of the peak 608 as an additional frequency support point for another iteration of the parabola approximation.

An advantage of the "method of Brent" is that the course of a peak in the vicinity of its maximum in any event resembles a parabola and the course of the peak in the vicinity of the peak maximum can be very well approximated by an approximating parabola. When one approximates the peak by a series of approximating parabolas, these approximating parabolas converge very quickly. In this way, the peak maximum can be ascertained with high accuracy even with just a few iterations.

APPENDIX A

The Goertzel Algorithm

Serving as starting point for derivation of the Goertzel algorithm is the discrete Fourier transformation (DFT), which in general form can be written as:

$$X(k) = \sum_{m=0}^{N-1} x(m) \cdot e^{-2\pi i \frac{km}{N}} \quad (5)$$

In order to simplify the equation, the phase factors are represented in the following by the symbols $W_N^j$:

$$W_N^j = e^{-2\pi i \frac{j}{N}} \quad (6)$$

Thus, the discrete Fourier transformation can be written as $$X(k) = \sum_{m=0}^{N-1} x(m) \cdot W_N^{km} \quad (7)$$

For whole numbered k, $W_N^{-kN}=1$ and the discrete Fourier transformation can be multiplied with this factor $W_N^{-kN}$ without changing the equality:

$$X(k) = W_N^{-kN} \cdot \sum_{m=0}^{N-1} x(m) \cdot W_N^{km} = \sum_{m=0}^{N-1} x(m) \cdot W_N^{-k(N-m)} \quad (8)$$

From this equation, it can be seen that a folding, or convolution, is involved. When the sequence $y_k(n)$ is defined as $$y_k(n) = \sum_{m=0}^{N-1} x(m) \cdot W_N^{-k(n-m)} \quad (9)$$

then it is clear that the $y_k(n)$ are formed by folding an input sequence x(n) of length N (thus of finite length) with a filter. From comparison of Equations (8) and (9), it follows that the output of this filter at the point in time n=N delivers the desired result of the DFT, namely the frequency amplitude at the frequency $$\omega_k = \frac{2\pi k}{N}:$$

$$X(k) = y_k(n)|_{n=N} \quad (10)$$

The filter, with which the input sequence x(n) is convoluted in Equation (9), is characterized by the following pulse response $h_k(n)$:

$$h_k(n) = W_N^{-kn} \cdot u(n) \quad (11)$$

In such case, u(n) stands for a step function, which equals zero for n<0 and equals one for n≥0. For the filter with the above set forth pulse response $h_k(n)$, then a 'z' transformation is performed, in order to ascertain the transfer function $H_k(z)$ for this filter. One obtains the transfer function:

$$H_k(z) = \frac{1}{1 - W_N^{-k} z^{-1}} \quad (12)$$

This transfer function possesses a pole on the unit circle at the frequency $$\omega_k = \frac{2\pi k}{N}.$$

Such a transfer function represents a resonator at the frequency $\omega_k$. The entire DFT can be calculated by feeding the block of input data in a parallel bank of N single pole filters, respectively resonators, wherein each of the filters has a pole location at the respective frequency of the DFT.

Instead of calculating the DFT as in Equation (9) by a folding, the filter behavior can also be represented by a difference equation derived from the transfer function $H_k(z)$. Such a difference equation enables recursive calculating of $y_k(n)$. One obtains as difference equation $$y_k(n) = W_N^{-k} \cdot y_k(n-1) + x(n) \text{ mit } y_k(-1) = 0 \quad (13)$$

The desired result is $X(k) = y_k(N)$, for k=0, 1 ... N−1. For performing this calculating, it is advantageous to calculate and store the phase factors $W_N^{-k}$ once at an earlier point in time.

The complex multiplications and additions required for calculating the difference Equation (13) can be avoided by combining with one another, in each case, pairs of resonators, which possess complexly conjugated poles. In this way, one obtains two pole filters with transfer functions of the form $$H_k(z) = \frac{1 - W_N^k z^{-1}}{1 - 2\cos\left(\frac{2\pi k}{N}\right) z^{-1} + z^{-2}} \quad (14)$$

A filter with this transfer function $H_k(z)$ can be represented by the following two difference equations:

$$v_k(n) = 2\cos\left(\frac{2\pi k}{N}\right) \cdot v_k(n-1) - v_k(n-2) + x(n) \quad (15)$$

$$y_k(n) = v_k(n) - W_N^k v_k(n-1) \quad (16)$$

with the starting conditions $v_k(-1) = v_k(-2) = 0$.

Figure 7:
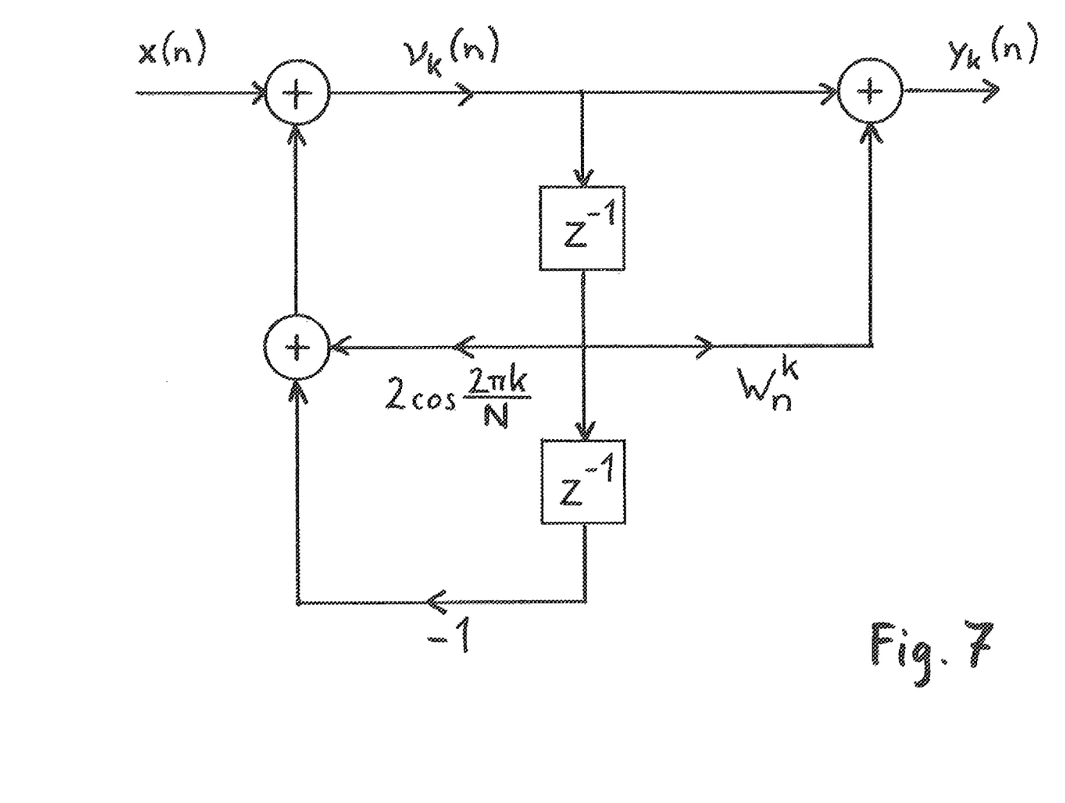
FIG. 7 shows a graphical representation of a filter, which delivers associated frequency amplitude at a predetermined frequency in accordance with the Goertzel algorithm.

FIG. 7 shows a graphical representation of this two pole filter, which is defined by the transfer function (14), respectively the difference Equations (15), (16). It can be seen that the input value delayed by one iteration is fed back to the input with the factor $$2 \cdot \cos\left(\frac{2\pi k}{N}\right),$$

while, in contrast, the input value delayed by two iterations is fed back to the input with negative sign. The value $y_k(n)$ on the output is obtained by subtracting from the input value the input value delayed by one iteration and multiplied with the factor $W_N^k$. This corresponds to the iteration directions set forth in Equations (15) and (16). The recursive relationship in (15) is iterated for $n=0, 1 \ldots N$, while Equation (16) is evaluated only a single time for time $n=N$. Each iteration requires only one real multiplication and two additions. As a result, this algorithm requires for a real input sequence $x(n)$ $n+1$ real multiplications. The Goertzel algorithm is especially attractive when the DFT is to be calculated only for a relatively small number M of values, wherein $M \leq \log_2 N$.

The limitation of k to whole numbers in Eq. (8) serves for an understandable derivation of the Goertzel algorithm. For application of the DFT (FFT) and of the Goertzel filter, this limitation is not necessary, it means, however, that for whole numbered values of k, the DFT and the Goertzel algorithm deliver exactly the same results in amplitude and phase. For non-whole numbered values of k, the DFT and Goertzel algorithms differ by a factor $W_N^{-kN}$, whose magnitude is 1 and only rotates the phase. The amplitude values of the two methods always agree, however.

The invention claimed is:

1. A method for determining distances to radar targets by means of FMCW radar, comprising the steps as follows:
    transmitting a frequency-modulated transmission signal, receiving a received signal reflected on at least one radar target,
    mixing down the received signal into an intermediate frequency range the obtained intermediate signal into an intermediate frequency signal,
 transforming the intermediate frequency signal into the frequency domain by means of a fast Fourier transformation, wherein a frequency spectrum is obtained as a sequence of frequency sample values;
    detecting peaks in the frequency spectrum;
    introducing at least one additional frequency support point in the vicinity of a detected peak;
    determining a frequency amplitude at said at least one additional frequency support point by means of the Goertzel algorithm;
    determining a position of the peak maximum of the detected peak by applying both said frequency sample values delivered by the fast Fourier transformation as well as also the frequency amplitude at said at least one additional frequency support point, and
 converting the position of the peak maximum into the distance to the radar target.

2. The method as claimed in claim 1, characterized by at least one of the following:
    the intermediate frequency signal comprises a sequence of time sample values in the time domain;
    the fast Fourier transformation transforms the intermediate frequency signal, which comprises a sequence of time sample values in the time domain, into a sequence of frequency sample values in the frequency domain;
    the intermediate frequency signal comprises a sequence of time sample values in the time domain, wherein before performing the fast Fourier transformation an average value of the discrete time signal is ascertained, and wherein the average value is subtracted from each of the time sample values before performing the fast Fourier transformation;
    the intermediate frequency signal comprises a sequence of time sample values in the time domain, wherein before performing the fast Fourier transformation a section for the fast Fourier transformation is selected from the sequence of time sample values;
    the intermediate frequency signal comprises a sequence of time sample values in the time domain, wherein before performing the fast Fourier transformation a section for the fast Fourier transformation is selected from the sequence of time sample values, wherein the section has $2^n$ time sample values, wherein n is a natural number; and
    the fast Fourier transformation delivers a regular raster of frequency sample values in the frequency domain.

3. The method as claimed in claim 1, characterized by at least one of the following:
    for detecting peaks in the frequency spectrum, the frequency sample values delivered by the fast Fourier transformation are compared with a threshold value, wherein an exceeding of the threshold value means that a peak has been detected;
    the regular raster of frequency sample values delivered by the fast Fourier transformation is further divided in the vicinity of the detected peak by introduction of at least one additional frequency support point;
    the frequency resolution of the frequency spectrum is improved in the vicinity of the detected peak by further dividing the regular raster of frequency sample values delivered by the fast Fourier transformation by introduction of at least one additional frequency support point; and
    introducing at least one additional frequency support point in the vicinity of the detected peak enables determining the position of the peak maximum of the peak with increased accuracy.

4. The method as claimed in claim 1, further comprising the steps of:
    interpolating behavior of the peak in the vicinity of the peak maximum of the detected peak by applying both the frequency sample values as well as also the frequency amplitude at the at least one additional frequency support point.

5. The method as claimed in claim 1, further comprising the steps of:
- introducing additional frequency support points by subdividing frequency intervals between neighboring points in the frequency domain in the vicinity of a peak; and
- determining frequency amplitudes at the additional frequency support points by means of the Goertzel algorithm.

6. The method as claimed in claim 1, further comprising the steps of:
- a) selecting points with so far highest frequency amplitudes from so far known points of the frequency spectrum in the vicinity of a peak;
- b) introducing additional frequency support points by halving frequency intervals between neighboring points in the frequency domain in the vicinity of the peak;
- c) determining frequency amplitudes at additional frequencies support points by means of the Goertzel algorithm; and
- d) repeatedly performing steps a) to c), until the position of the peak maximum of the peak has been determined with a predetermined accuracy.

7. The method as claimed in claim 1, further comprising the steps of:
- a) selecting points with so far highest frequency amplitudes from so far known points of the frequency spectrum in the vicinity of a peak;
- b) introducing additional frequency support points by subdividing frequency intervals between neighboring points in the frequency domain in the vicinity of the peak;
- c) determining frequency amplitudes at additional frequencies support points by means of the Goertzel algorithm; and
- d) repeatedly performing steps a) to c), until the position of the peak maximum of the peak has been determined with a predetermined accuracy.

8. The method as claimed in claim 7, characterized in by at least one of the following:
- frequency intervals between neighboring points in the frequency domain in the vicinity of the peak are divided according to a predetermined division ratio;
- frequency intervals between neighboring points in the frequency domain in the vicinity of the peak are halved; and
- frequency intervals between neighboring points in the frequency domain in the vicinity of the peak are divided according to a predetermined division ratio, wherein the golden section is used as division ratio.

9. The method as claimed in claim 1, wherein:
- the position of the peak maximum of the peak is determined based on the frequency sample values delivered by the fast Fourier transformation by means of parabolic interpolation according to the method of Brent.

10. The method as claimed in claim 1, further comprising the steps of:
- a) selecting in the vicinity of the peak three neighboring points of the frequency spectrum, which have the highest so far ascertained frequency amplitudes;
- b) establishing an approximating parabola through the three points;
- c) introducing the frequency of the peak of the approximating parabola as an additional frequency support point;
- d) determining frequency amplitude at the additional frequency support point by means of the Goertzel algorithm; and
- e) repeating steps a) to d), until the position of the peak maximum of the peak has been determined with a predetermined accuracy.

11. The method as claimed in claim 1, characterized by at least one of the following:
- the method is applied in a fill-level measuring device for determining fill level by means of FMCW radar; and
- the method is applied in the context of a fill level measurement by means of FMCW radar, in order to determine fill level in a container or tank.

12. A distance measuring device for determining distance to radar targets by means of FMCW radar, comprising:
- a transmitting unit, which transmits a radar transmission signal;
- a receiving unit, which receives a radar received signal reflected on at least one radar target, mixes the radar received signal down into an intermediate frequency range and digitizes the obtained intermediate frequency signal; and
- an evaluation unit, which is designed to determine the distance to the radar target by means of, wherein:
- the intermediate frequency signal is transformed into the frequency domain by means of a fast Fourier transformation, wherein a frequency spectrum is obtained as a sequence of frequency sample values;
- peaks are detected in the frequency spectrum;
- at least one additional frequency support point is introduced in the vicinity of a detected peak;
- a frequency amplitude is determined at the at least one additional frequency support point by means of the Goertzel algorithm;
- a position of the peak maximum of the detected peak is determined by applying both the frequency sample values delivered by the fast Fourier transformation as well as also the frequency amplitude at the at least one additional frequency support point; and
- converting the position of the peak maximum into the distance to the radar target.

13. The distance measuring device as claimed in claim 12, characterized by at least one of the following:
- the distance measuring device is a fill-level measuring device;
- the distance measuring device is a fill-level measuring device, which is designed to determine a fill level in a container or tank; and
- the distance measuring device is a field device for use in process automation.

* * * * *